Nov. 20, 1956 C. B. BECK ET AL 2,771,347
DENSIFICATION OF INK GRADE CARBON BLACKS
Filed Jan. 25, 1954
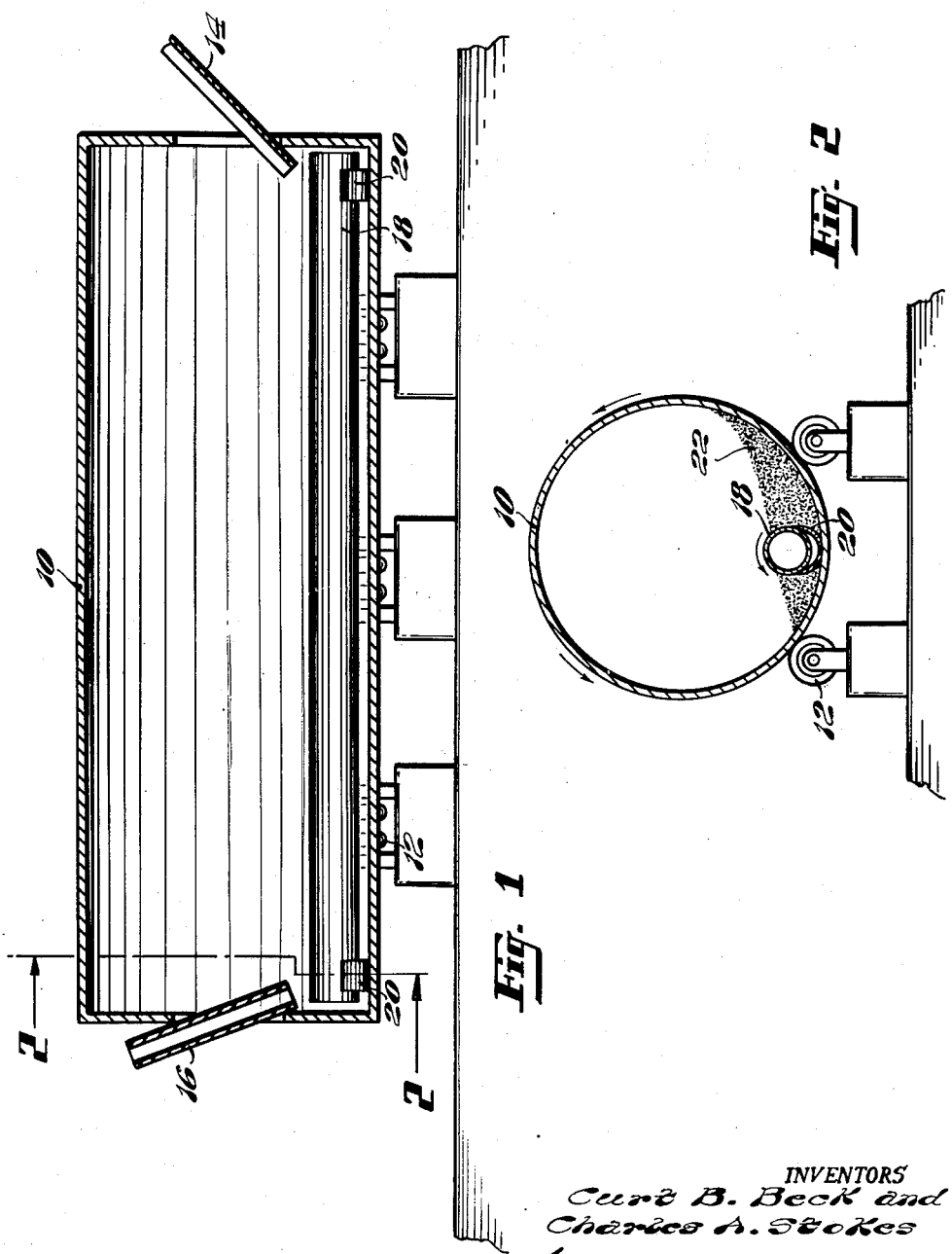
INVENTORS
Curt B. Beck and
Charles A. Stokes

United States Patent Office 2,771,347
Patented Nov. 20, 1956

2,771,347

DENSIFICATION OF INK GRADE CARBON BLACKS

Curt B. Beck, Pampa, Tex., and Charles A. Stokes, Wellesley Hills, Mass., assignors to Godfrey L. Cabot, Inc., Boston, Mass., a corporation of Massachusetts Application January 25, 1954, Serial No. 405,969

6 Claims. (Cl. 23—314)

This invention relates to the densification of carbon black and more particularly to a novel process for producing a substantially dustless, densified carbon black product adapted primarily for use in lithographic and high-grade printing inks.

Numerous techniques for densifying rubber grade carbon blacks have become well established in the art. These techniques have not, however, been satisfactory for densifying ink blanks because when so treated the black can not satisfactorily be incorporated into the ink vehicle. Only by the use of addition materials such as emulsifying agents has it been possible to produce a densified ink grade black in pellet form which is satisfactorily dispersible and this largely because the pellets contain substantial quantities of water. Further, as the addition material must be selected with reference to the ink formula in which the black is compounded no single formulation will suffice for all uses.

This invention has for its principal object the provision of a process for densifying carbon black to a substantially nondusting condition without impairing its dispersibility in lithographic ink or varnish type vehicles.

Another object is to provide a process for producing a dense, substantially nondusting carbon black product suitable for use in any lithographic ink or black varnish formulation.

Another object is to provide a process for producing such a carbon black product which can be carried out in presently available densification apparatus with only minor alteration thereof.

Another object is to provide a process for producing such a product without the use of any addition material other than water.

The process of this invention is carried out in a horizontally mounted rotating drum containing a roller equipped with eccentric legs. The roller is practically as long as the drum and is not attached to the drum but is free to roll therein as the drum is rotated. With each revolution of the roller it is lifted by the eccentric legs with the effect hereinafter described.

In operation a selected ink grade carbon black is charged to the drum to a depth not exceeding the diameter of the roller plug legs. The black is wetted with water in an amount equal to 2 to 12% of the weight of the black either before the black is charged to the drum, or thereafter, and the drum is rotated. Once started the process is continuous, densified black being withdrawn at one end while fresh black is delivered to the other end.

Apparatus in which the process of our invention may advantageously be carried out is illustrated in the accompanying drawing in which Fig. 1 is a sectional view in side elevation of a densifying drum and roller, and Fig. 2 is an end view taken along line 2—2 of Fig. 1.

The densing drum 10 may be of the type commonly employed for the production of carbon black pellets. It is mounted on rubber tired wheels 12 driven by an external source of power (not shown). In the inlet end of the drum 10 is a feed chute 14 and in the outlet end is a discharge chute 16 of conventional type. Within drum 10 is a free rolling weight or roller 18 of substantially the same length as drum 10. Roller 18 is provided at each end with eccentric legs 20 so attached that the roller will ride up and over the legs with each revolution. Such legs 20 may advantageously be constructed from a segment of pipe of larger diameter than that of the roller 18. The carbon black bed 22 is shown schematically in Fig. 2.

It will be seen that as drum 10 revolves it will cause roller 18 to revolve in the same direction. With each revolution the roller will ride up and over legs 20 and will drop back onto the bed of carbon black. While the roller is elevated the black will slide downward toward the vertical center of the drum. Were it not for legs 20 the black would all be held away from the low point in the drum by the roller and would receive no benefit from the compacting action of the roller.

Although the process of this invention is advantageously carried out in a drum of the type commonly used for the production of pellets only a minor proportion of the black is converted to pellet form in this process. In fact, the formation of any significant amount of pellets must studiously be avoided since pellets in substantial concentration cannot satisfactorily be dispersed in ink vehicle. Thus processes of the type described in U. S. Patent No. 2,164,164, Price, in which rollers are included in the drum to assist in the production of hard pellets are wholly unsuitable for the purposes of this invention.

The mechanism of densification as it occurs in the novel process of our invention appears to be thus. As the drum is rotated the roller also rotates, although much more rapidly, in an eccentric path. The roller drops from its legs onto the bed of black, rolls across the surface of the bed and is lifted off, allowing black to slide down from the rising drum wall. The roller must be sufficiently heavy to exert a compacting effect and to inhibit formation of pellets. We have used rolls varying in weight from 20 to 100 lbs. per foot of length with satisfactory results.

In the following example are set forth data illustrating the results achieved by the practice of the process of our invention.

| Run No | B-61 | B-19 |
|---|---|---|
| Type of black (channel) | Elfo | Mogul S |
| Drum—diameter, in | 72 | 16 |
| length, in | 120 | 18 |
| speed, R. P. M | 9 | 5 |
| black bed depth, in | 14 | 6 |
| Roller—diameter, in | 12.75 | 5.56 |
| length, in | 118 | 16.5 |
| weight, lbs | 350 | 32 |
| leg length, in | 1.5 | 0.5 |
| Moisture content of black, percent by wt | 4 | 8.3 |
| Tap density of black, lbs./cu. ft.: | | |
| As fed | 12 | 12.5 |
| Product | 17.1 | 16 |
| Production rate, lbs./hr | 125-200 | 1 |

After breakup of the product, in a centrifugal fan for B-61 and by brushing through a 48 mesh screen for B-19, the black was incorporated into a standard #1 lithographic varnish on a 3-roll mill as follows:

| Run No | B-61 | B-19 |
|---|---|---|
| percent black | 10 | 12 |
| mixing time, sec | 60 | 40 |
| no. of passes through mill | 2-3 | 3-4 |

In each case there was no mill hang back and dispersion in the varnish was fully the equivalent of that for undensified fluffy blacks of the same type.

We have found that certain of the conditions recited above are critical. Particularly so is the water content and bed depth of the black. Thus only about 2 to 12%, and preferably 2 to 7%, water by weight of the black can be used and the depth of the black in the drum can not be substantially greater than a distance equal to the diameter of the roller plus the length of its legs.

When it is considered that ink blacks now in commercial use have a density of about 3–13 pounds per cubic foot and hence are fluffy and very dusty it will be apparent that the process of this invention represents an important advance in the art. By the practice of our invention the very fluffy and dusty black of commerce is made substantially dustless by a modest increase in density to about 16 pounds per cubic foot or moderately higher and yet there is left substantially unimpaired its dispersion qualities in ink vehicles when it is incorporated therein by usual 3-roll mill techniques.

While the densified product of the process of this invention may satisfactorily be mixed with ink vehicle on the 3-roll mill with relatively little hangback or concentration of undispersed carbon black it may sometimes be advantageous to subject the densified black to mechanical pulverization to improve ease of mixing. Thus, the densified black may be passed through a high speed fan, brushed through a screen, etc. Such treatment causes a slight decrease in density but does not adversely affect its dustless properties. It is thus within the contemplation of our invention to add a pulverization or breakup treatment to the densification step of the process.

Having thus described our invention, we claim:

1. A process for densifying printing ink grade carbon black without substantially impairing its dispersion qualities in ink vehicles which consists in moistening the black with 2–12% water by weight of the black and tumbling the black in a rotating drum while intermittently and rythmically pressing the mass of black along substantially its full length therein by rolling a continuous-walled cylindrical weight in an eccentric path across the surface of the black.

2. The process of claim 1 in which the carbon black is maintained in the drum at a substantially constant depth no greater than the distance between the lowest point in the drum and the upper surface of the weight at the top of its trajectory.

3. A process for densifying printing ink grade carbon black having satisfactory dispersion qualities in ink vehicles which consists in agitating such black moistened with 2–12% water on a moving surface provided by the wall of a slowly rotating drum intermittently and rythmically pressing the body of black under the force exerted by rolling a heavy, solid-walled cylinder across the surface of the black and lifting the cylinder off the black with each revolution of the cylinder and returning it to the black, and continuing the agitation, and intermittent pressing until the black has been densified to at least about 16 lbs. per cu. ft.

4. The process of claim 3 further characterized by mechanically subdividing the densified black.

5. The process of claim 3 in which the cylinder is caused to be lifted by means of a plurality of radial projections or legs disposed along the length of the cylinder in a single axial plane.

6. A process for densifying ink grade carbon black having an initial density of less than about 13 lbs. per cu. ft. which consists in wetting the black with 2–12% water by weight of the black and tumbling the black in a rotating drum containing a free-rolling cylindrical weight provided with a plurality of radial projections or legs whereby the black is subjected to intermittent pressure from said weight thus being densified and the majority of any pellets formed by the tumbling is broken up.

References Cited in the file of this patent

UNITED STATES PATENTS

| 2,127,137 | Price | Aug. 16, 1938 |
| 2,131,686 | Heller et al. | Sept. 27, 1938 |
| 2,164,164 | Price | June 27, 1939 |
| 2,309,970 | McKinney | Feb. 2, 1943 |
| 2,500,968 | Venuto | Mar. 21, 1950 |
| 2,402,106 | Skoog et al. | Mar. 28, 1950 |

OTHER REFERENCES

Mantell: "Industrial Carbon," 2nd ed., 1946, pages 95, 101 D. Van Nostrand Co., Inc.